United States Patent
Wang et al.

(10) Patent No.: US 11,401,178 B2
(45) Date of Patent: Aug. 2, 2022

(54) METHODS OF REMOVING AND RECOVERING PHOSPHORUS FROM AQUEOUS SOLUTIONS

(71) Applicant: THE JOHNS HOPKINS UNIVERSITY, Baltimore, MD (US)

(72) Inventors: Chao Wang, Ellicott City, MD (US); Michael Manto, Baltimore, MD (US); Pengfei Xie, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 164 days.

(21) Appl. No.: 16/610,700

(22) PCT Filed: May 4, 2018

(86) PCT No.: PCT/US2018/031107
§ 371 (c)(1),
(2) Date: Nov. 4, 2019

(87) PCT Pub. No.: WO2018/204796
PCT Pub. Date: Nov. 8, 2018

(65) Prior Publication Data
US 2020/0087169 A1    Mar. 19, 2020

Related U.S. Application Data

(60) Provisional application No. 62/501,636, filed on May 4, 2017.

(51) Int. Cl.
*C02F 1/42* (2006.01)
*B01J 20/18* (2006.01)
(Continued)

(52) U.S. Cl.
CPC .............. *C02F 1/42* (2013.01); *B01J 20/18* (2013.01); *B01J 20/28061* (2013.01);
(Continued)

(58) Field of Classification Search
CPC ... C02F 1/42; C02F 1/281; C02F 1/288; B01J 20/18; B01J 20/28061; C01B 25/00
See application file for complete search history.

(56) References Cited

U.S. PATENT DOCUMENTS 4,034,065 A * 7/1977 Kasai ................. B01D 53/02
423/700
5,488,020 A * 1/1996 Diesen ................. C07C 2/52
502/60
(Continued)

FOREIGN PATENT DOCUMENTS

CN    105771916 A    7/2016
CN    106732756 A    5/2017

OTHER PUBLICATIONS

Yinhai He et al., Simultaneous removal of ammonium and phosphate by alkaline-activated and lanthanum-impregnated zeolite, Chemosphere, vol. 164 (2016), pp. 387-395,ISSN 0045-6535, https://doi.org/10.1016/j.chemosphere.2016.08.110. (Year: 2016).*

(Continued)

*Primary Examiner* — Chester T Barry
(74) *Attorney, Agent, or Firm* — Johns Hopkins Technology Ventures

(57) ABSTRACT

Described are methods of removing phosphorous from aqueous solutions using copper-substituted aluminosilicate materials. The copper-substituted aluminosilicate materials are copper-substituted zeolites that are recyclable and have desirable recovery efficiencies. Also described are methods of making copper-substituted aluminosilicate materials, using copper-substituted aluminosilicate materials, systems using copper-substituted aluminosilicate materials, and methods of using these systems.

20 Claims, 12 Drawing Sheets

(51) Int. Cl.
*B01J 20/28* (2006.01)
*C02F 1/28* (2006.01)
*C02F 101/10* (2006.01)
*C02F 103/00* (2006.01)

(52) U.S. Cl.
CPC ........ *C02F 1/281* (2013.01); *C02F 2101/105* (2013.01); *C02F 2103/001* (2013.01)

(56) References Cited

U.S. PATENT DOCUMENTS

| | | | | |
|---|---|---|---|---|
| 6,780,806 | B1* | 8/2004 | Yang | B01D 53/02 502/60 |
| 7,514,002 | B1* | 4/2009 | Betsumori | B01J 20/2805 210/660 |
| 2010/0172828 | A1 | 7/2010 | Althoff et al. | |
| 2010/0243571 | A1* | 9/2010 | Semiat | B01J 20/3416 210/668 |
| 2012/0014867 | A1* | 1/2012 | Bull | B01J 29/68 423/700 |
| 2014/0154175 | A1 | 6/2014 | Li et al. | |
| 2016/0184797 | A1 | 6/2016 | Powell et al. | |

OTHER PUBLICATIONS

Herman, et al., "Preparation of copper(II)-exchanged y zeolites from sodium and ammonium y zeolites" Adsorption and Ion Exchange with Synthetic Zeolites. ACS symposium Series, 1980, vol. 135, chapter 9, pp. 177-186.

Wouters, et al., "Reversible tetrahedral-octahedral framework aluminum transformation in zeolite Y" Journal of the American Chemical Society, 1998, vol. 120, issue 44, pp. 11419-11425.

* cited by examiner

METHODS OF REMOVING AND RECOVERING PHOSPHORUS FROM AQUEOUS SOLUTIONS

CROSS-REFERENCE TO RELATED APPLICATIONS

This application is a 35 U.S.C. § 371 U.S. national entry of International Application PCT/US2018/031107 having an international filing date of May 4, 2018, which claims the benefit of U.S. Provisional Application No. 62/501,636, filed May 4, 2017, the content of each of the aforementioned applications is herein incorporated by reference in their entirety.

STATEMENT REGARDING FEDERALLY SPONSORED RESEARCH

This invention was made with government support under contract no. CBET-1437219 awarded by the National Science Foundation. The government has certain rights in the invention.

FIELD OF THE DISCLOSURE

The present disclosure relates to methods of removing phosphorus from water. More specifically, the present disclosure relates to copper-substituted aluminosilicate materials for removing phosphorus from water.

BACKGROUND OF THE DISCLOSURE

Interest is growing in the development of separation processes for the efficient removal and regeneration of inorganic phosphorus from wastewaters. Dissolved inorganic phosphorus is a primary source of water contamination originating from industrial wastewater or agricultural runoffs. The presence of high levels of inorganic phosphorus in ponds, rivers and lakes can lead to eutrophication, threatening the existence of fish and other aquatic life. On the other side, inorganic phosphorus is broadly used as fertilizers in agriculture to promote the growth of crops and the demand escalates as the population continues to grow. The world's supply of inorganic phosphorus today, however, relies on depleting feedstocks such as phosphate rocks. It thus becomes imperative, not only for pollution mitigation, but also for the sustainable production of fertilizers, to develop efficient and cost-effective methods for separation of inorganic phosphorus from aqueous solutions.

The most common method of phosphorus separation is chemical precipitation, typically in the form of struvite. Although feasible for implementation, this method consumes valuable feedstocks such as ammonia and/or magnesium salts. Meanwhile, struvite precipitation requires operation under high-pH conditions and precise control over the molar ratio of ammonium ($NH_4^+$), magnesium ($Mg^{2+}$), and phosphates, which add challenges to the process design and incur additional costs for scale-up applications. The use of other cations, such as $Al^{3+}$ and $Fe^{3+}$ that are capable of precipitating phosphate under more robust conditions, however, generates products undesired for agricultural purposes. In light of the challenges present in chemical precipitation, efforts have been devoted to the development of new separation processes, such as using sorbents for capture of phosphate anions.

Zeolites have attained great attention as ion-exchange materials due to their chemical and structural stability, tunable and selective adsorption properties, employment of naturally abundant elements, and environmental compatibility. Natural zeolites such as clinoptilolite and gibbsite have previously been reported for capture and release of phosphates. Their limited capacity and specificity, however, have inspired the exploration of more robust sorbents. Synthetic zeolites have been demonstrated as useful for inorganic phosphorus capture, yet with poor efficiency (<10%) of release. Some synthetic zeolites modified with high-valence metal cations such as La(III) have been shown to possess high capacity of phosphate adsorption, up to ~80 mg—inorganic phosphorus per gram of sorbent, and release efficiencies as high as 100%. But despite the demonstrated potential for inorganic phosphorus separation, these sorbents still involve rare-earth elements, and fundamental questions about the mechanisms of capacity enhancement persist. There is accordingly an unmet need for improved compositions and methods for use in removal and regeneration of inorganic phosphorus from wastewaters, and in other settings. The present disclosure is pertinent to this need.

SUMMARY OF THE DISCLOSURE

The present disclosure provides methods of removing phosphorus from samples. The present disclosure also provides methods of making copper-substituted aluminosilicate materials. In particular, the disclosure relates to efficient and cost-effective separation of phosphorus from aqueous solutions, and thus is suitable for, for example, mitigating pollution caused by phosphate in agricultural runoffs, but it also, for example, for providing a renewable source for production of phosphorus-based chemicals and fertilizes.

In more detail, the present disclosure relates to the use of copper-substituted aluminosilicate materials (e.g., copper-substituted zeolites such as, for example, Cu-ZSM-5), as sorbents for recovery of inorganic phosphorus (e.g., phosphorus species such as, for example, phosphate anions such as, for example, phosphate, hydrogen phosphate, and dihydrogen phosphate, trihydrogen phosphate, and combinations of phosphorus species) (which are also referred to herein as P). Fast capture and release of phosphate anions are demonstrated with, for example, >90% efficiency of recovery using synthetic solutions of $Na_2HPO_4$ and NaCl, respectively. The zeolite sorbents are also found to be recyclable and sustain desirable recovery efficiencies after multiple capture-release cycles. Cu(II) species in the zeolites are identified to be the active sites for anion adsorption, upon which a ligand exchange mechanism is described for the capture and release of phosphorus.

The disclosure includes copper-substituted aluminosilicates themselves, systems comprising copper-substituted aluminosilicates, such as, for example, water processing systems, substrates with which the copper-substituted aluminosilicates are complexed, including covalent and non-covalent complexes, membranes, filters, columns, and the like. For example, the disclosure provides a sorption-membrane or filter that comprises a copper-substituted aluminosilicate described herein.

In an aspect, the present disclosure provides methods of removing phosphorus from samples. The methods are based on use of one or more copper-substituted aluminosilicate of the present disclosure.

In an aspect, the present disclosure provides methods of making copper-substituted aluminosilicate materials, such as any copper-substituted zeolite of this disclosure. The methods are based on anion exchange of sodium ions of an aluminosilicate material for copper ions.

In an aspect, the present disclosure provides kits and devices comprising the copper-substituted aluminosilicate (e.g., copper-substituted zeolites) for use in separating phosphorus-containing compounds from aqueous fluids, and for recovery of the separated phosphorus-containing compounds.

BRIEF DESCRIPTION OF THE FIGURES

For a fuller understanding of the nature and objects of the disclosure, reference can be made to the following detailed description taken in conjunction with the accompanying figures.

DETAILED DESCRIPTION OF THE DISCLOSURE

Figure 1:
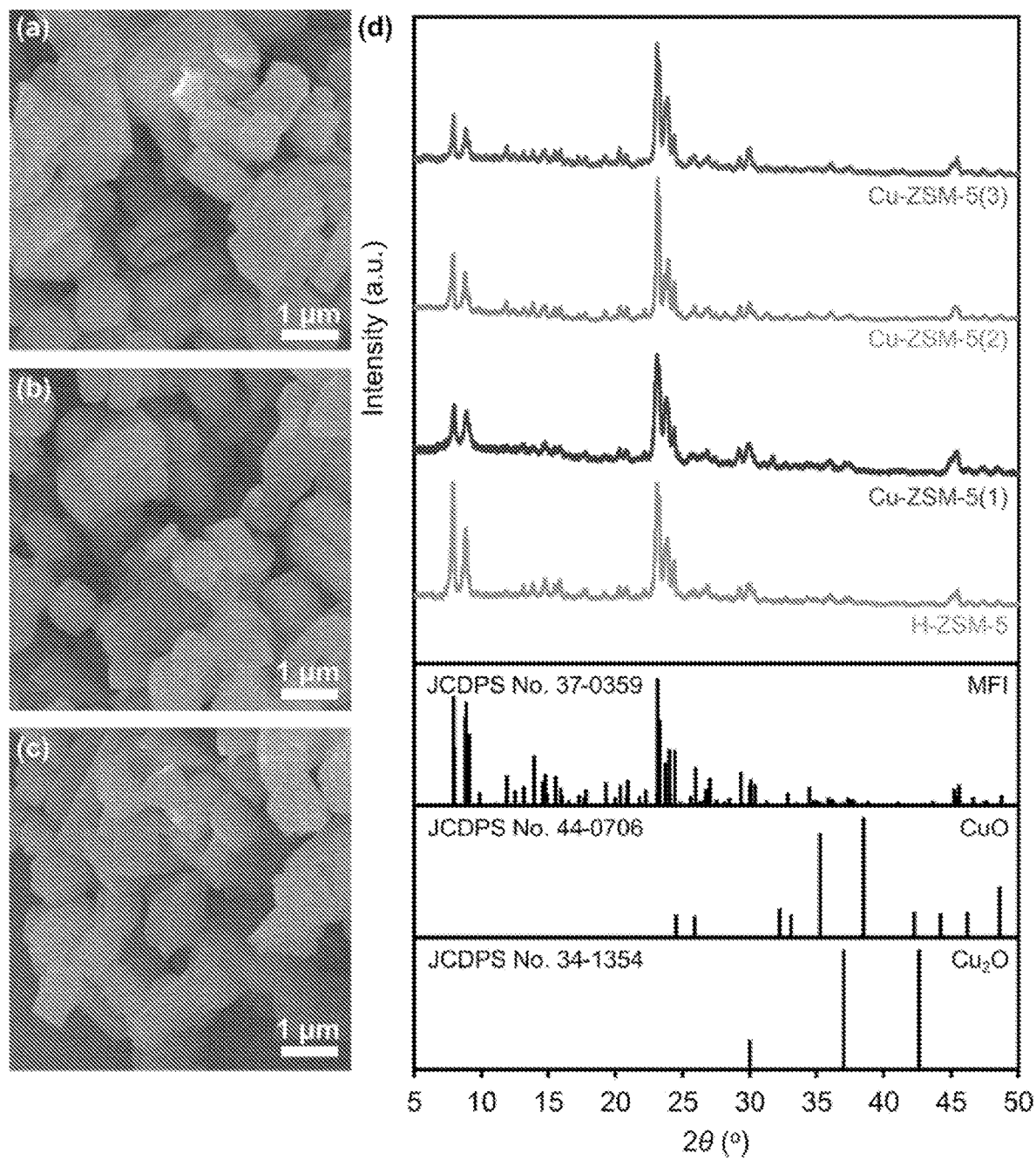
FIG. 1 shows SEM images of (a) $NH_4$-ZSM-5, (b) H-ZSM-5 and (c) Cu-ZSM-5(3). (d) XRD patterns of the intermediate H-ZSM-5 and Cu-ZSM-5 sorbents compared to JCDPS PDF cards for MFI, CuO and $Cu_2O$.

Although claimed subject matter will be described in terms of certain examples and embodiments, other examples and embodiments, including examples and embodiments that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides methods of removing phosphorus from samples. The present disclosure also provides methods of making copper-substituted aluminosilicate materials. In particular, the disclosure relates to efficient and cost-effective separation of phosphorus from aqueous solutions, and thus is suitable for, for example, mitigating pollution caused by phosphate in agricultural runoffs, but it also, for example, for providing a renewable source for production of phosphorus-based chemicals and fertilizes.

As used herein, the term aqueous liquid refers to water comprising one or more phosphorus-containing compound (e.g., inorganic phosphorus). Examples of aqueous liquids include, but are not limited to, wastewater (e.g., industrial wastewater or municipal wastewater), runoff (e.g., agricultural runoff), and water (e.g., water from a body of water such as, for example, a stream, river, pond, lake, ocean), The aqueous liquid can be referred to as a fluid, an aqueous fluid, an aqueous solution, a fluid solution, a water solution, a solution, a sample, a water sample, a liquid sample, an aqueous sample, or water.

In more detail, the present disclosure relates to the use of copper-substituted aluminosilicate materials (e.g., copper-substituted zeolites such as, for example, Cu-ZSM-5), as sorbents for recovery of inorganic phosphorus (e.g., phosphorus species such as, for example, phosphate anions such as, for example, phosphate, hydrogen phosphate, and dihydrogen phosphate, trihydrogen phosphate, and combinations of phosphorus species) (which are also referred to herein as P). Fast capture and release of phosphate anions are demonstrated with, for example, >90% efficiency of recovery using synthetic solutions of $Na_2HPO_4$ and NaCl, respectively. The zeolite sorbents are also found to be recyclable and sustain desirable recovery efficiencies after multiple capture-release cycles. Cu(II) species in the zeolites are identified to be the active sites for anion adsorption, upon which a ligand exchange mechanism is described for the capture and release of phosphorus.

All schemes and methods of making the compositions of this disclosure as described in the examples below are included within the scope of the disclosure, and given the benefit of this disclosure, those skilled in the art will be able to modify such schemes and methods to produce copper-substituted aluminosilicate materials for use in any particular process, kit, systems, or device.

The disclosure includes copper-substituted aluminosilicates themselves, systems comprising copper-substituted aluminosilicates, such as, for example, water processing systems, substrates with which the copper-substituted aluminosilicates are complexed, including covalent and non-covalent complexes, membranes, filters, columns, and the like. For example, the disclosure provides a sorption-membrane or filter that comprises a copper-substituted aluminosilicate described herein.

In an aspect, the present disclosure provides methods of removing phosphorus from samples. The methods are based on use of one or more copper-substituted aluminosilicate of the present disclosure.

In an example, the disclosure provides a method for recovery of phosphorus-containing compounds from aqueous solutions. In examples, the phosphorus-containing compound comprises, consists of, or essentially consists of a phosphate.

In an example, a method for removing inorganic phosphorus (e.g., phosphorus species such as, for example, phosphate anions such as, for example, phosphate, hydrogen phosphate, and dihydrogen phosphate, trihydrogen phosphate, and the like, and combinations of phosphorus species)

from a sample comprises: providing one or more copper-substituted aluminosilicate material (e.g., an aluminosilicate material, such as, for example, a zeolite material, comprising a plurality of copper species, such as, for example, a Cu(II) species (e.g., a plurality of copper species adsorbed on at least a portion of an exterior surface of the aluminosilicate material)); contacting the aluminosilicate material with a sample comprising inorganic phosphorus, wherein at least a portion of the inorganic phosphorus in the sample is associated (e.g., at least a portion of the inorganic phosphorus is adsorbed on at least a portion of the aluminosilicate material and/or chemically bonded to copper species of the aluminosilicate material (e.g., via anion exchange)) with the aluminosilicate material; and removing the aluminosilicate material after contacting the aluminosilicate materials with the sample. In various examples, at least a portion (e.g., at least 50%, at least 60%, at least 70%, at least 80%, at least 90%, at least 95%, or at least 99%) of the inorganic phosphorus is removed from the sample.

A method for removing inorganic phosphorus (e.g., phosphorus species such as, for example, phosphate anions such as, for example, phosphate, hydrogen phosphate, and dihydrogen phosphate, trihydrogen phosphate, and combinations of phosphorus species) from a sample may further comprise contacting the aluminosilicate material, after removing the material from the sample, with an aqueous medium comprising a chloride salt (e.g, NaCl and the like). For example, the aqueous medium is 1 g chloride salt per liter of water. In various examples, at least a portion (e.g., at least 70%, at least 80%, at least 90%, at least 95%, or at least 99%) of the inorganic phosphorus associated with aluminosilicate material dissociates/is released from the aluminosilicate material and is in the aqueous medium, and, optionally, removing the aluminosilicate material from the aqueous medium. A method may further comprise isolating (e.g., by precipitation and the like) at least a portion of the inorganic phosphorus from the aqueous medium after any contacting and, optionally, removing step. For example, the inorganic phosphorus is present in the sample at 0.0001 to 0.01 weight %, including all 0.00001 weight % values and ranges therebetween, based on the total weight of the sample.

In examples, the disclosure provides an iterative process, wherein the same copper-substituted aluminosilicate (e.g., copper-substituted zeolite) is used in successive rounds of phosphorus-containing compound capture and release (e.g., dissociation). In an approach, this comprises i) combining an aqueous liquid comprising one or more phosphorus-containing compounds in a suitable container such that aqueous liquid comes into contact with a copper-substituted aluminosilicate (e.g., copper-substituted zeolite) of this disclosure, ii) allowing the copper-substituted aluminosilicate (e.g., copper-substituted zeolite) to contact the liquid for a period of time such that adsorption of one or more phosphorus-containing compounds by the copper-substituted aluminosilicate (e.g., copper-substituted zeolite) occurs, iii) removing some or all of the one or more phosphorus-containing compounds from the aluminosilicate (e.g., zeolite) occurs, and repeating steps i)-iii) at least one additional time. For example, a method further comprises repeating a desired number of times the providing one or more copper-substituted aluminosilicate material, contacting the copper-substituted aluminosilicate material with a sample, removing the aluminosilicate material after the contacting, optionally, contacting the aluminosilicate material from after the removing with an aqueous medium comprising a chloride salt (e.g., NaCl and the like), and, optionally, removing the aluminosilicate material from the aqueous medium after contacting the aluminosilicate material with an aqueous medium comprising a chloride salt (e.g., NaCl and the like) contacting from the aqueous medium.

The methods can be batch processes or continuous processes. In an example, contacting the copper-substituted aluminosilicate material with a sample comprising inorganic phosphorus is carried out by flowing a sample through a copper-substituted aluminosilicate material (e.g., a packed bed comprising a copper-substituted aluminosilicate material). Optionally, the sample can be recycled (e.g., flowed through the copper-substituted aluminosilicate material (e.g., a packed bed comprising a copper-substituted aluminosilicate material) a desired number of times).

In certain approaches, the aqueous solution (e.g., sample) processed as described herein comprises surface water, groundwater, municipal or industrial effluents, including but not necessarily limited to sewage, and/or agricultural run-off water, or one or more combinations thereof. In embodiments, the disclosure relates to separation of phosphorus-containing compounds from water during the production and/or processing of any of drinking water, potable water, industrial service water, or water used in agricultural settings, including, but not limited to, farming of plant-based products and agricultural animals. In examples, the water comprises one or more fertilizer(s), including but not necessarily limited to plant fertilizers. In examples, the disclosure pertains to separating phosphorus-containing compounds from water that may be initially present in a lake, water, stream, or any other tributary through which water travels, and wherein the water contains phosphorus-containing compounds that would be desirable to separate from the water. Thus, the water may comprise fresh water, brackish water, or salt water. In an example, the aqueous solution (e.g., sample) has a pH of 8 to 9.

The disclosure provides for recovery of the adsorbed phosphate using any suitable approaches, including but not limited to ligand exchange mechanisms, such as ion-exchange, non-limiting examples of which are described herein.

The disclosure provides for separating phosphorus containing compounds from water and, optionally, concentrating and/or purifying such compounds. In an example, the disclosure comprises separating phosphorus containing compounds from an aqueous solution, and placing the phosphorus containing compounds in a container for downstream uses in, for example, fertilizer production. Thus, in an example, the disclosure comprises processing a water sample as described herein to obtain phosphorus containing compounds that may be purified to any desired degree of purity, placing the phosphorus containing compounds in any suitable container, and optionally distributing and/or selling and/or reselling the phosphorus containing compounds to another party, and/or incorporating the phosphorus containing compounds into any product in which the compounds may be useful, including but not necessarily limited to a fertilizer product. Thus, fertilizers and other compositions made using phosphorus containing compounds separated from aqueous fluids as described herein are encompassed by this disclosure.

The copper-substituted aluminosilicates (e.g., copper-substituted zeolites) can be provided in any suitable form. In examples, copper-substituted aluminosilicates are provided as crystals, microparticles, powders, grains, or granules, etc. The copper-substituted aluminosilicates can be provided with any desirable oxidation state of Cu in the zeolite material. In examples, a copper-substituted aluminosilicate composition is provided wherein some, most, or all of the copper in the aluminosilicate composition is Cu(II). In an example, the aluminosilicate materials are particulate materials having an average size (e.g., average longest dimension) of about 1 micron.

The copper-substituted aluminosilicate material can comprise various amounts of copper species. For example, a copper-substituted aluminosilicate material comprises copper species at 0.001 to 10 weight % (e.g., 3-4 weight %), including all 0.0001% values and ranges therebetween, based on the total weight of the copper-substituted aluminosilicate material. Without intending to be bound by any particular theory, it is considered that the copper species loading is related to the concentration of copper ions in solutions used to make the copper-substituted aluminosilicate materials.

The copper-substituted aluminosilicate material can comprise various amounts of aluminum and copper species. For example, a copper-substituted aluminosilicate material comprises aluminum and copper species at a molar ratio of 0.4 to 5.5. In another example, aluminum and copper species molar ratio is 0.4 to 5.1, including all 0.01 molar ratio values and ranges therebetween.

Various amounts of copper-substituted aluminosilicate materials can be used. For example, the amount of copper-substituted aluminosilicate material provides a sample having 0.0001 to 10 weight % (e.g., 0.1 to 5 weight %) copper-substituted aluminosilicate material based, including all 0.0001% values and ranges therebetween, on the total weight of sample and copper-substituted aluminosilicate material.

The copper-substituted aluminosilicate materials can have various surface areas. In an example, copper-substituted aluminosilicate materials have a surface area (e.g., BET surface area) of 350 to 400 $m^2/g$, including all 0.1 $m^2/g$ values and ranges therebetween.

The copper-substituted aluminosilicate material can be a copper-substituted zeolite. In an example, copper-substituted aluminosilicate material is a copper-substituted zeolite made from a zeolite having the formula $Na_n Al_n Si_{96-n} O_{192} \cdot 16 H_2O$, wherein is 7-8 (e.g., n=7.68 and the zeolite is ZSM-5).

An aluminosilicate material can be pretreated to form a copper-substituted aluminosilicate material. For example, $NH_4$-aluminosilicate material is converted to H-aluminosilicate material, H-aluminosilicate material is converted to Na-aluminosilicate material, and Na-aluminosilicate material is converted to Cu-aluminosilicate material) prior to contact with the sample. For example, commercially available $NH_4$-ZSM-5 is converted to H-ZSM-5, H-ZSM-5 is converted to Na-ZSM-5, and Na-ZSM-5 is converted to Cu-ZSM-5.

In an example, the disclosure comprises combining an aqueous liquid comprising one or more phosphorus-containing compounds in a suitable container such that aqueous liquid comes into contact with a copper-substituted aluminosilicate (e.g., copper-substituted zeolite) of this disclosure, and allowing the copper-substituted aluminosilicate to contact the liquid for a period of time such that adsorption of the one or more phosphorus-containing compounds by the copper-substituted zeolite occurs. The disclosure includes allowing the copper-substituted zeolite to contact the liquid for a period of time such that adsorption of any amount of the phosphorus-containing compounds in the liquid by the copper-substituted aluminosilicate occurs. In various examples, 10-100% of the phosphorus-containing compounds in the liquid, including all 0.1% values and ranges therebetween, is adsorbed by the copper-substituted zeolite.

Thus, the disclosure provides compositions comprising an aqueous fluid and a copper-substituted zeolite as described herein, wherein 10-100%, including all 0.1% values and ranges therebetween, of the phosphorus-containing compounds in the liquid prior to being exposed to the copper-substituted aluminosilicate becomes present in a complex with the copper-substituted zeolite. In examples, such complexes comprise any molar ratio of phosphorus-containing compounds and Cu described herein. In examples, the phosphorus-containing compounds/Cu molar ratio is about 1. However, the sorbent (copper-substituted aluminosilicate) loading stoichiometry can be modified, such that the P/Cu molar ratio can be greater than 1, such as up to ~2.5, or even higher.

In an aspect, the present disclosure provides methods of making copper-substituted aluminosilicate materials, such as any copper-substituted zeolite of this disclosure. The methods are based on anion exchange of sodium ions of an aluminosilicate material for copper ions.

In an example, a method of making a copper-substituted aluminosilicate material comprises: heating (e.g., calcining) an aluminosilicate material (e.g., an $NH_4$-aluminosilicate material) to form an H-aluminosilicate material; contacting the H-aluminosilicate material with an aqueous solution comprising a sodium salt (e.g., $NaNO_3$ and the like) to form an Na-aluminosilicate material; contacting the Na-aluminosilicate material with an aqueous solution comprising copper (II) ions (e.g., copper (II) acetate, copper (II) chloride, copper (II) nitrate, and the like) to form the copper-substituted aluminosilicate material.

In another example, a method of making a copper-substituted aluminosilicate material (e.g., a copper-substituted zeolite) comprises: heating (e.g., calcining at 450° C. for 4 h in static air) a commercially available $NH_4$-aluminosilicate (e.g., $NH_4$-zeolite such as, for example, $NH_4$-ZSM-5 (Si/Al=11.5), which converted the $NH_4$-aluminosilicate to an H-aluminosilicate (e.g., $NH_4$-zeolite to an H-zeolite such as, for example, H-ZSM-5); forming a Na-zeolite (e.g., Na-zeolite such as, for example, Na-ZSM-5) by, for example, dispersing a H-aluminosilicate (e.g., H-ZSM-5) in a sodium salt solution (e.g., 1 M $NaNO_3$ solution) (about 10 ml solution was used per gram of zeolite) and heating the dispersion (e.g., heating at 80° C. under stirring for 4 h); contacting the Na-aluminosilicate (e.g., Na-zeolite) with $Cu^{2+}$ cations to form Cu-aluminosilicate (e.g., Cu-zeolite such as, for example, Cu-ZSM-5) by exchanging (e.g., two or three times) Na-aluminosilicate (e.g., Na-zeolite) in a copper salt solution (e.g., 0.01 mol/L copper(II) acetate solution or 0.1 M copper(II) acetate solution) at room temperature (e.g., 18° C. to 25° C., including all 0.1° C. values and ranges therebetween) (e.g., at 25° C. for 24 h). After each exchange step, the Cu-zeolites are optionally rinsed with deionized water three times. The methods further comprise drying the obtained Cu-aluminosilicates (e.g., Cu-zeolites such as, for example, Cu-ZSM-5) were dried (e.g., at 100° C. overnight in static air).

A method of making a copper-substituted aluminosilicate, optionally, further comprises isolating the copper-substituted aluminosilicate material. In various examples, the isolating is carried out by filtration or centrifugation.

A method of making a copper-substituted aluminosilicate, optionally, further comprises calcining an aluminosilicate material (e.g., an $NH_4$-aluminosilicate material) to provide the H-aluminosilicate material.

Any parameter described herein can be compared to any suitable reference. In examples, a suitable reference comprises a value obtained or derived from one or more control experiments, or may comprise a known value or range of values, a statistical value, such as an area under a curve, etc. In examples, any parameter described herein can be compared to a suitable control obtained from using, for example, a non-copper metal or other element-substituted zeolite, including but not limited to H-ZSM-5 or Na-ZSM-5.

In an aspect, the present disclosure provides kits and devices comprising the copper-substituted aluminosilicate (e.g., copper-substituted zeolites) for use in separating phosphorus-containing compounds from aqueous fluids, and for recovery of the separated phosphorus-containing compounds.

In certain and non-limiting examples the disclosure provides a container comprising an amount of a copper-substituted zeolite as described herein that is suitable to process a given volume of water. In examples, the container comprises, for example, a cartridge, or drum, or a tank. In examples, the container is a component of a device or system that is used for separating phosphorus-containing compounds from an aqueous solution. In examples, the device or system can be configured to provide, for example, a flow of water through an area that has an amount of copper-substituted zeolite in a first location wherein phosphorus-containing compounds in the aqueous solution is adsorbed to the copper-substituted zeolite. The device or system may provide for separation of the phosphorus-containing compounds, and may provide for effluent to be captured and passed through the copper-substituted zeolite at least one additional time, or may provide for the effluent to be released into another component of the device or system for further processing, or it may permit the effluent to be discharged into any suitable location. Those skilled in the art will recognize that any such device and/or system can also include various components that are conventionally used for processing water, including but not limited to one or a series of conduits, appropriate valves that can permit movement of water through the system for processing, such as in a timed sequence of operations, temperature controls, resins, membranes, reactors, and can be combined with any other water processing approaches, including but not necessarily limited to filtering through any suitable membrane, and/or passing the liquid through one or more ion exchange resins for further processing, including, but not limited to, strong acid cation exchange resins (SAC), weak acid cation exchange resins (WAC) or chelating ion exchange resins, or a reverse osmosis (RO) system. Thus, the water can be processed to modify parameters such as colloidal matter, hardness and silica content. In examples, a device/system of this disclosure can include a solid-liquid separator, a bioreactor, and/or a sidestream reactor.

The steps of the methods described in the various embodiments and examples disclosed herein are sufficient to carry out the methods of the present disclosure. Thus, in an example, a method consists essentially of a combination of the steps of the methods disclosed herein. In another example, a method consists of such steps.

The following example is presented to illustrate the present disclosure. It is not intended to limiting in any matter.

Example 1

This example provides a description of examples of methods of the present disclosure.

Described is an example of the use of copper-substituted Zeolite Socony Mobil-5 (Cu-ZSM-S) as sorbents for the recovery of inorganic P from aqueous solutions. ZSM-5 represents an industrially important type of aluminosilicate with the general chemical formula of $Na_nAl_n Si_{96-n}O_{192} \cdot 16H_2O$. Isomorphous substitution of $Si^{4+}$ by $Al^{3+}$ produces a negative charge on the framework, which is usually compensated by adsorbed cations ($H^+$, $NH_4^+$ or $Na^+$). Substitution of these cations with $Cu^{2+}$ produces Cu-ZSM-S, with the introduced Cu sites believed to be active for anion exchange. Capture and release of phosphates are systematically studied using synthetic solutions to evaluate the dependences of adsorption capacity and release efficiency on the loading of sorbent and the extent of Cu substitution. The nature of the active sites is depicted by tuning the conditions of pretreatment and examining the effect of Cu oxidation state on P capture, upon which the mechanism for anion exchange is discussed.

RESULTS AND DISCUSSION. Synthesis and Characterization of Cu-ZSM-5. Commercial $NH_4$-ZSM-5 (Si/Al molar ratio of 11.5) was purchased and converted into Cu-ZSM-5 through a series of treatments. The as-received $NH_4$-ZSM-5 was first calcined to obtain H-ZSM-5 and then exchanged in a solution of sodium nitrate to produce Na-ZSM-5. Na-ZSM-5 was further subjected to cation exchange in solutions of copper(II) acetate to form Cu-ZSM-5 (Scheme 1, see the below more details of the synthesis). Na-ZSM-5 was employed for Cu substitution because the cation exchange in this case is more facile than that for H-ZSM-5.

Scheme 1. Synthesis protocol for the preparation of Cu -ZSM-5.

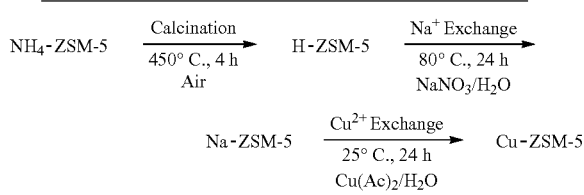

Three types of zeolites with different contents of Cu were obtained by tuning the conditions of synthesis, with the weight percentages of Cu determined by inductively coupled plasma mass spectrometry (ICP-MS) analysis to be 3.43%, 3.53% and 3.98%. From the results of elemental analysis, the Cu/Al ratios are determined to be 0.43, 0.45 and 0.51, corresponding to Cu site densities of 539, 556, and 626 $\mu mol_{Cu}/g_{zeolite}$ for the three types of zeolites, which are denoted as Cu-ZSM-5(1), Cu-ZSM-5(2) and Cu-ZSM-5(3), respectively, in the following discussion (Table 1). The obtained Cu-ZSM-5 preserved the particle size (~1 μm), as well as the morphology, of the commercial $NH_4$-ZSM-5 (FIG. 1 a-c). XRD patterns show neither significant change to the crystal structure of ZSM-5 nor the formation of copper oxides after the Cu substitution, and the major peaks can be assigned to the MFI type of zeolite framework (JCDPS No. 37-0359) (FIG. 1d). The specific surface areas estimated by the Brunauer-Emmett-Teller (BET) analysis are nearly consistent in the range of 365-373 $m^2/g$ for the three types of zeolites, as compared to 376 $m^2/g$ for Na-ZSM-5 (Table 1). Similar situations are also observed for the microporous volumes calculated by the t-plot method.

TABLE 1

Summary of Si/Al and Cu/Al molar ratios, Cu site density and BET surface areas for the Cu-ZSM-5 sorbents.

| Sample | Si/Al Molar Ratio | Cu/Al Molar Ratio | Cu Site Density ($\mu mol_{Cu}/g_{zeolite}$) | BET Surface Area ($m^2/g$) | $V_{micro}{}^a$ ($cm^3/g$) |
|---|---|---|---|---|---|
| Na-ZSM-5 | 11.5 | — | — | 376 | 0.163 |
| Cu-ZSM-5(1) | 11.5 | 0.43 | 539 | 373 | 0.163 |
| Cu-ZSM-5(2) | 11.5 | 0.45 | 556 | 369 | 0.161 |
| Cu-ZSM-5(3) | 11.5 | 0.51 | 626 | 365 | 0.160 |

$^a$Calculated by t-plot method

These characterizations suggest that the ZSM-5 has been successfully modified with atomic Cu species, with the microporous structure of the zeolites remaining intact. In the MFI framework of ZSM-5, the 10-membered rings form three-dimensional micropores of 5.4 to 5.6 Å in diameter, which are sufficiently large to allow for diffusion of phosphate anions in and out of the zeolites. In addition to the characterizations discussed above, the oxidation state of Cu in the obtained Cu-ZSM-5 has also been characterized by using X-ray photoemission spectroscopy (XPS), which is described further below in connection with the active sites for phosphate adsorption.

Figure 7:
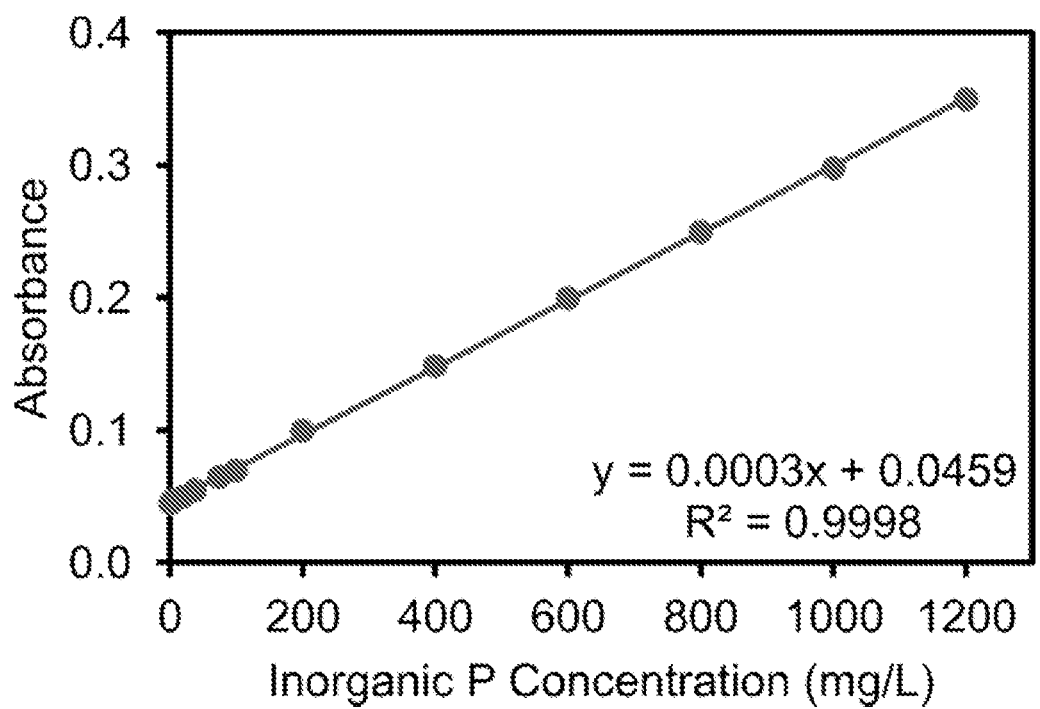
FIG. 7 shows UV-Vis standard curve at 890 nm for inorganic P.
Figure 8:
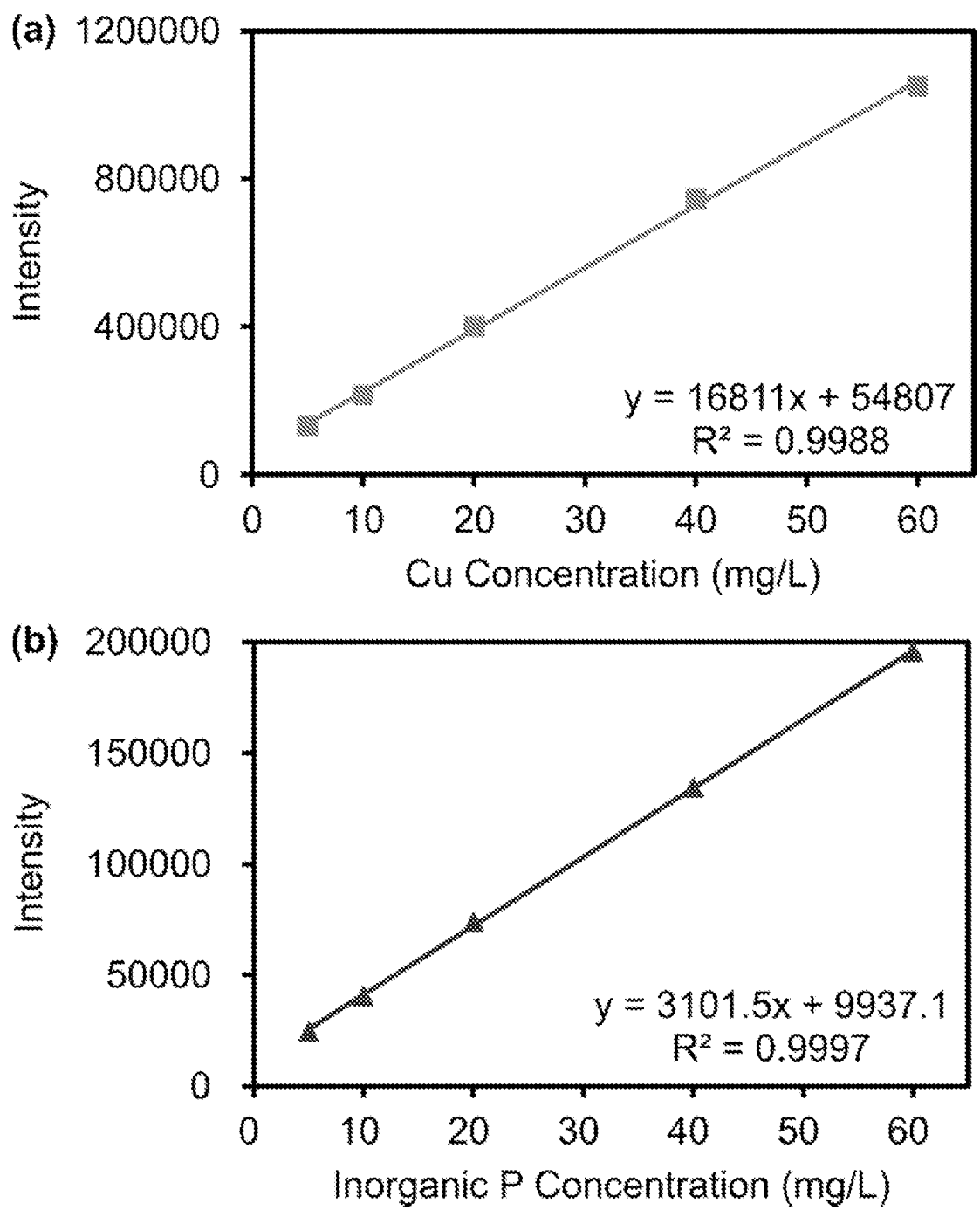
FIG. 8 shows ICP-MS standard curves for (a) Cu and (b) inorganic P.
Figure 9:
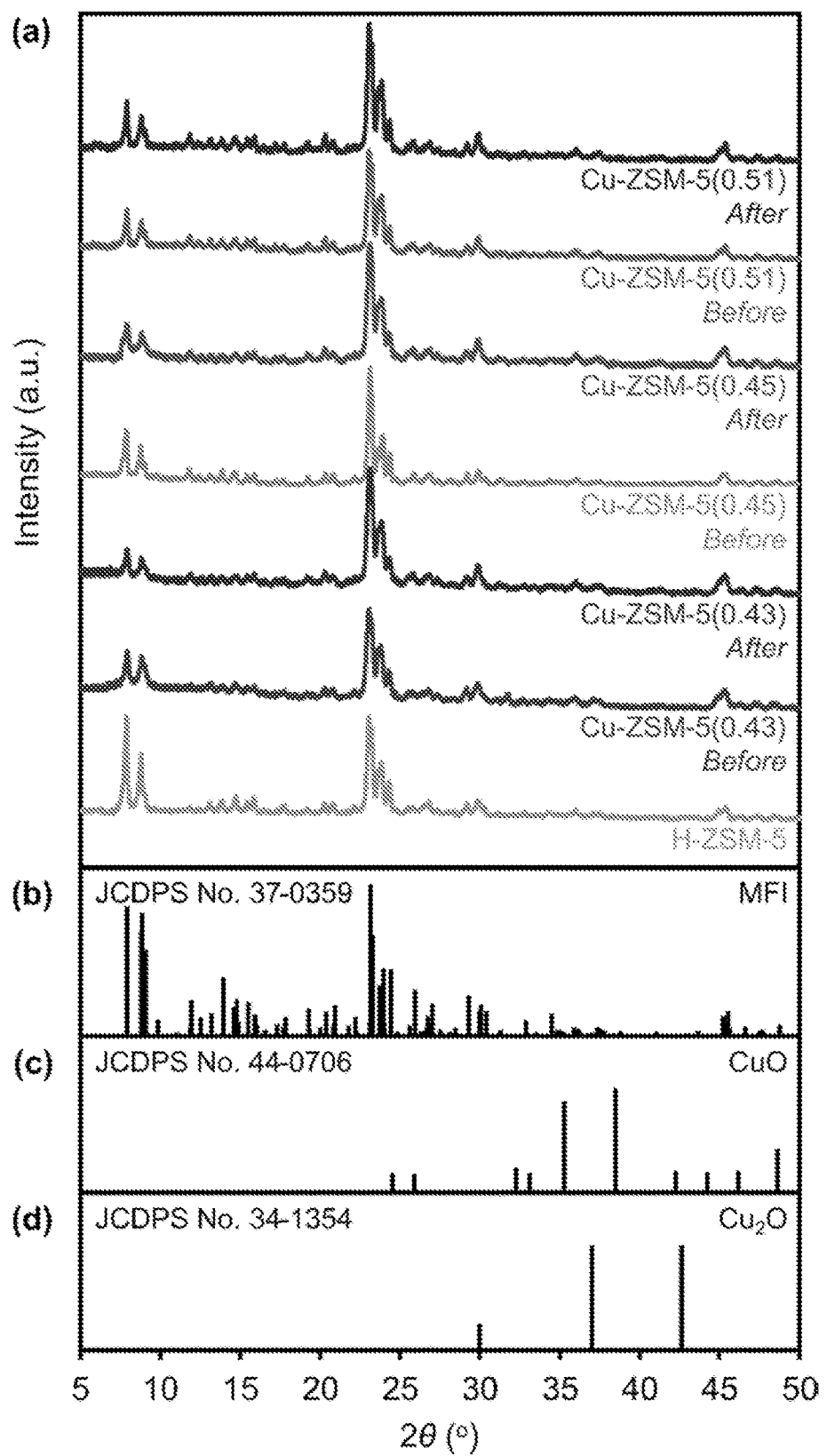
FIG. 9 shows (a) XRD patterns of the Cu-ZSM-5(Y) samples before and after recyclability analyses compared to the intermediate H-ZSM-5 and (b) JCDPS No. 37-0359 for MFI, (c) JCDPS No. 44-0706 for CuO and (d) JCDPS No. 34-1354 for $Cu_2O$.

P Capture in Synthetic Solutions. Capture of P was carried out with the Cu-ZSM-5 sorbents in synthetic solutions of $Na_2HPO_4$. In a typical process, 300 mg of zeolite is used for 10 ml of $Na_2HPO_4$ solution (1 g-P/L, pH=8.6). During the adsorption process, aliquots of solution were collected at various time intervals and after separation of the sorbent, the concentrations of dissolved P remaining in the solution were measured by using a molybdenum blue assay. The amounts of P captured by the zeolites were then determined as the difference between the initial and remaining concentrations of P in the solution (see the Methods and FIG. 7).

Figure 2:
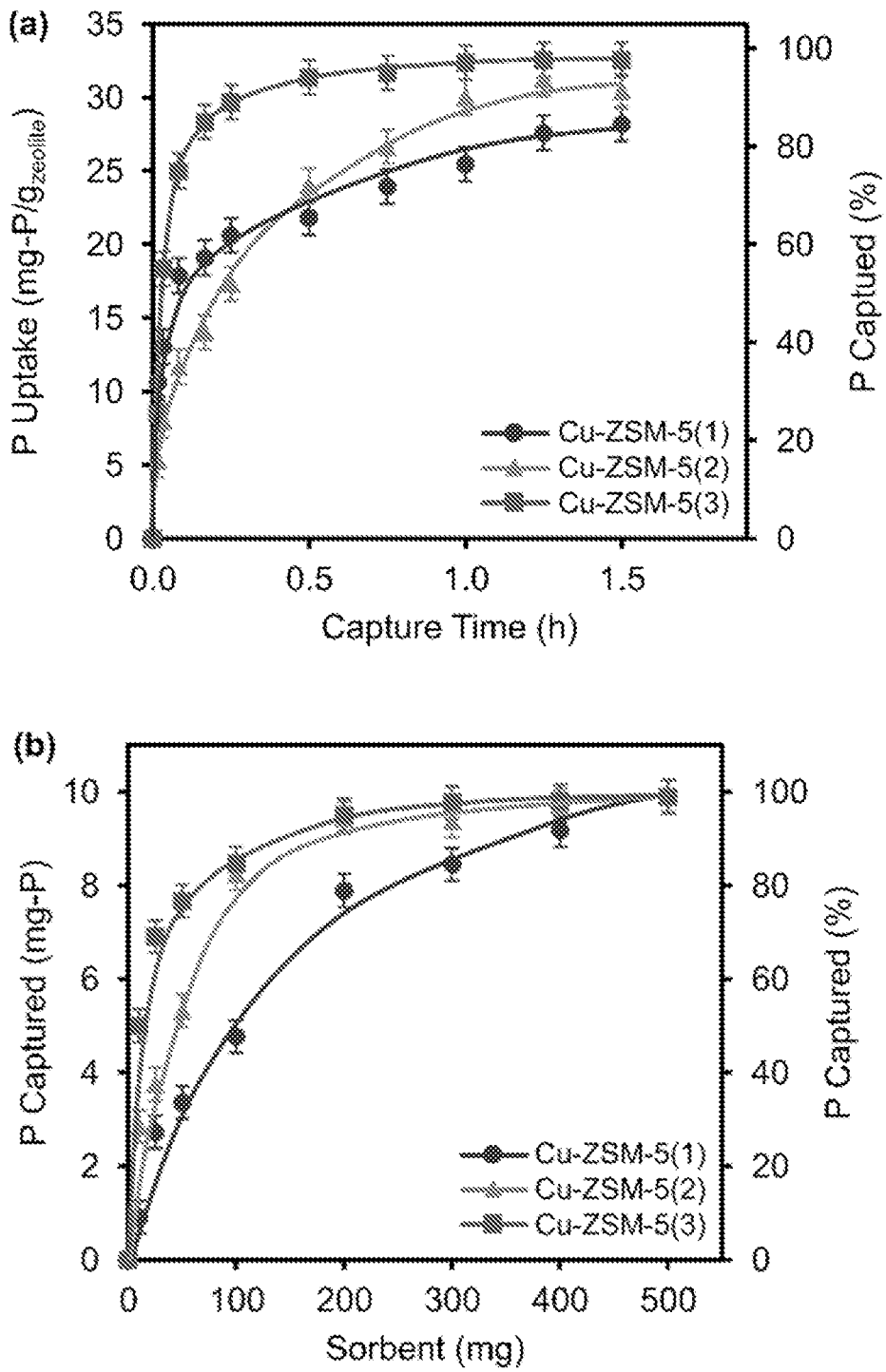
FIG. 2 shows (a) uptake of inorganic P and percentage of dissolved inorganic P captured from 1000 mg-P/L solutions for 300 mg of each Cu-ZSM-5 sorbent. (b) P captured from solutions of 1000 mg-P/L after 1.5 h (h=hour(s)) for various loadings of Cu-ZSM-5.

FIG. 2a shows the kinetic results for the three types of zeolite. A two-stage behavior is consistently observed: the amount of captured P has a rapid increase in the first ~15 min (min=minute(s)), and then the rate of sorption dramatically slows down (FIG. 2a). Within the studied period (1.5 h), uptake capacities of ca. 27, 30 and ~33 mg-P/$g_{zeolite}$ were achieved by using 300 mg of Cu-ZSM-5(1), Cu-ZSM-5(2) and Cu-ZSM-5(3), corresponding to capture of ca. 84.5, 91.2 and 98.9% of the dissolved inorganic P in the solutions, respectively. The trends of uptake capacity and capture efficiency are in line with the order of Cu site density in the zeolites (Table 1).

With the given amount of dissolved P (10 mg), the efficiency of P capture is highly dependent on the sorbent mass, with more P captured as the mass of applied zeolite increases (FIG. 2b). In the case of Cu-ZSM-5(1), the efficiency of P capture varies from ~9% to ~99% as the applied amount of adsorbent increases from 10 to 500 mg. While compared at the other loadings, the trend of capture efficiency is consistent with that observed when 300 mg of zeolite is used, namely Cu-ZSM-5(3)>Cu-ZSM-5(2)>Cu-ZSM-5(1). For the former two types of zeolite, the maximum efficiency, ~99% of the dissolved P (nearly complete sorption), is reached at sorbent loadings ≥200 mg, whereas it requires >400 mg of loading for Cu-ZSM-5(1) to reach the same efficiency.

Figure 3:
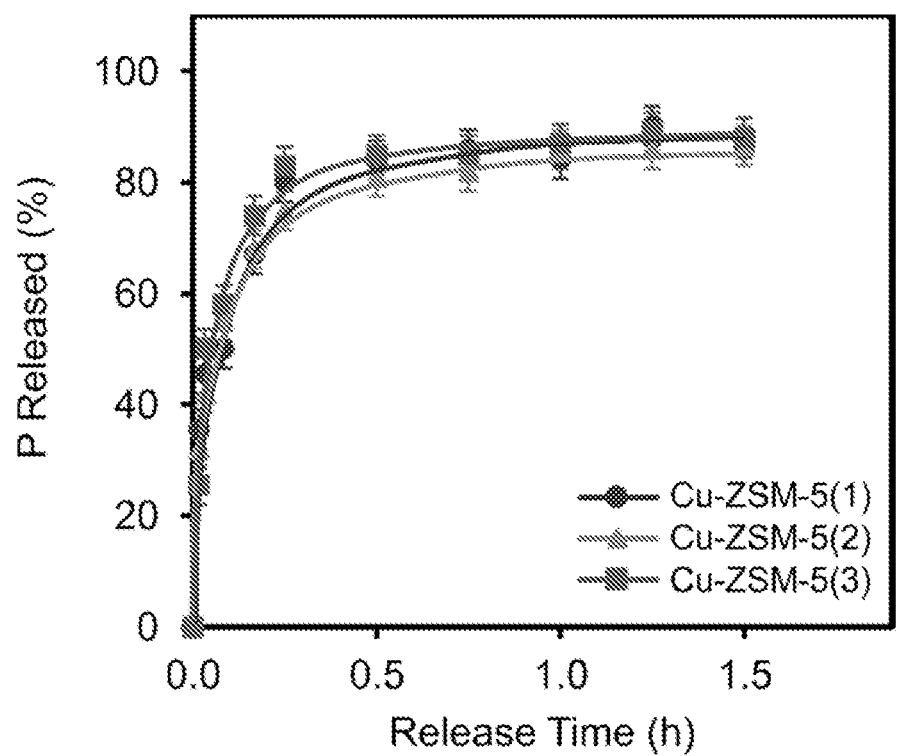
FIG. 3 shows inorganic P released from 300 mg of each Cu-ZSM-5 over time in the 1 g/L NaCl regenerative solution after the initial capture depicted in FIG. 2.

Release of P. Release of the captured P is crucial for the recovery of nutrients and for the development of cost-effective, reusable sorbent materials. To desorb the phosphate anions, the Cu-ZSM-5 sorbents are isolated from the capture solution and re-dispersed in a brine solution. The chloride anions exchange with the adsorbed phosphate, and the P released into the brine solution is again analyzed by using a molybdenum blue assay. Typically, 10 ml of NaCl solution (10 g/L) is used for 300 mg of sorbent. FIG. 3 presents the percentages of P released during the desorption process. For all the three types of zeolite sorbent, the release follows a two-stage behavior similar to that for capture (FIG. 2a), with a rapid release of nearly 80% of the captured P within the initial ~15 min. The fast kinetics of P release may be a result of the rather high concentrations of NaCl in the brine solutions, which provides high chemical potentials to drive the ion diffusion and exchange in the zeolites. The release of P is found to be independent on the Cu content in the zeolite and the loading of sorbent (10-500 mg), and the three types of zeolites have a consistent efficiency of release at ~87% (FIG. 3).

Recyclability of Cu-ZSM-5. After demonstrating the capture and release of P, recyclability of the sorbents is further studied by applying the Cu-ZSM-5 zeolites to successive capture and release cycles. Each cycle is carried out under the standard conditions, i.e., 300 mg of sorbent, 10 ml of $Na_2HPO_4$ solution (1 g/L) for capture and 10 ml of NaCl solution (10 g/L) for release.

Figure 4:
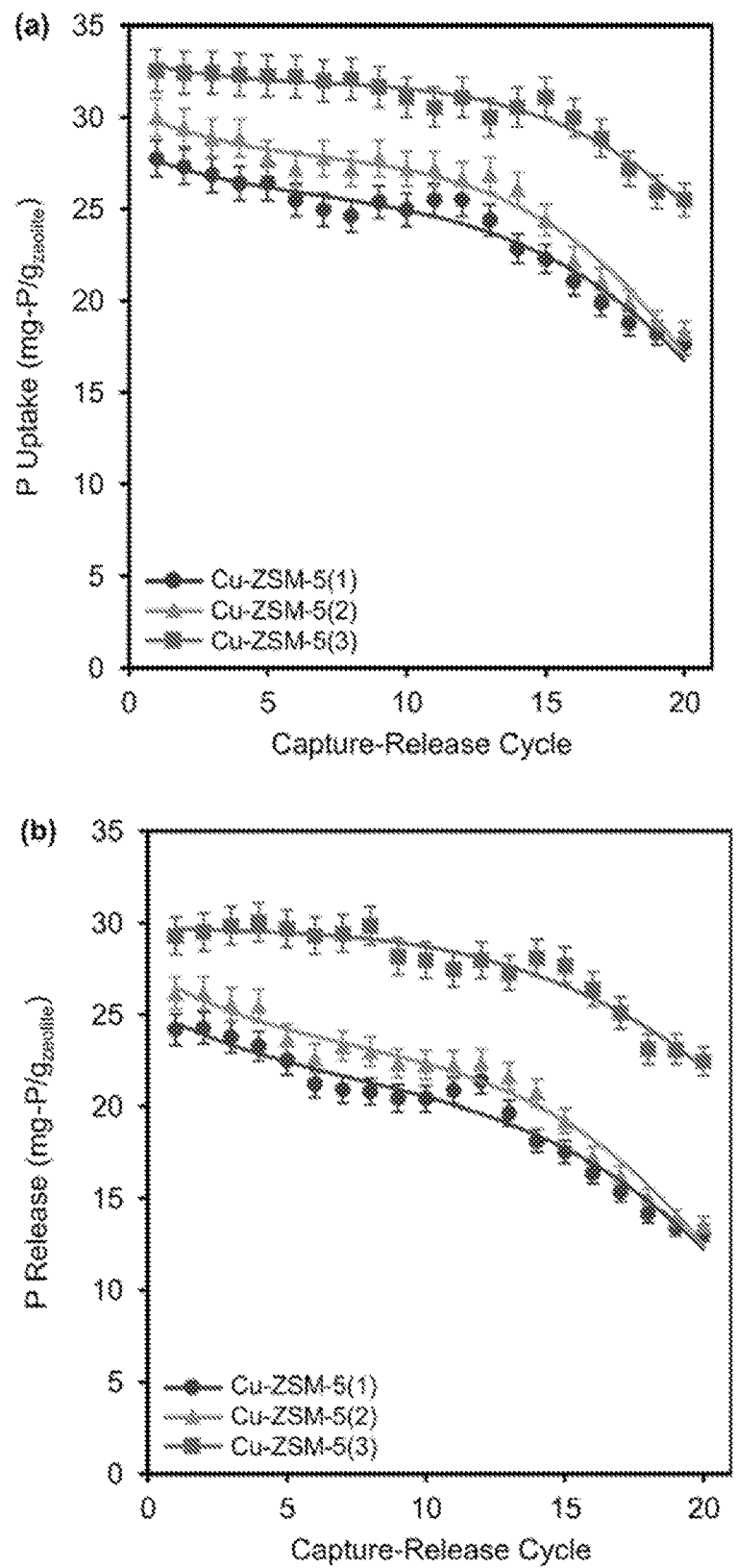
FIG. 4 shows recyclability analysis of each Cu-ZSM-5 sorbent showing (a) P uptake and (b) P release over a total of 20 capture-release cycles. (c) Release efficiency and recovery efficiency of each Cu-ZSM-5 sorbent over 20 capture-release cycles. (d) Changes in Cu site density determined by ICP-MS in each Cu-ZSM-5 sample before and after recyclability analyses.
Figure 4:
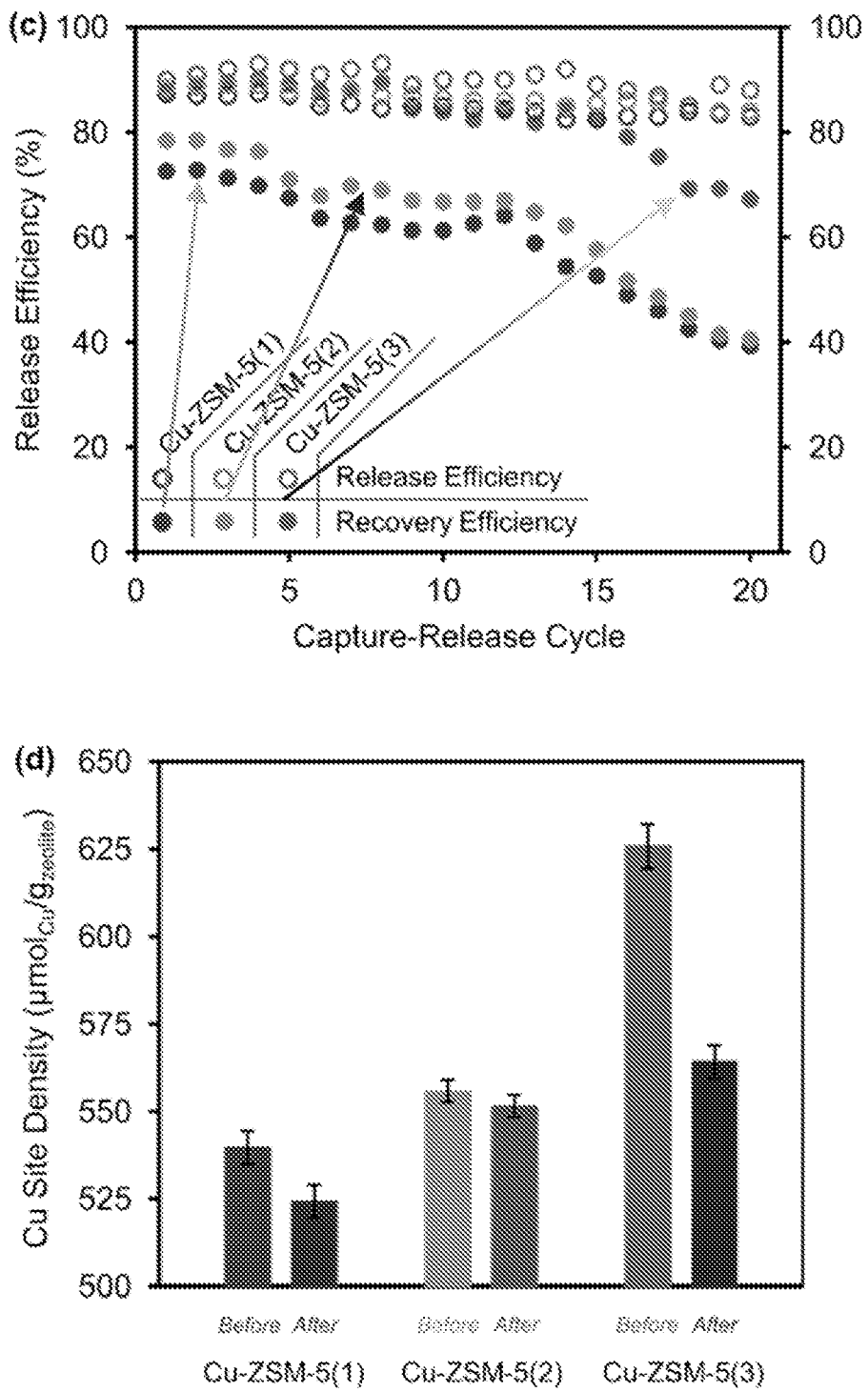

FIG. 4 summarizes the results of recyclability studies for the three types of Cu-ZSM-5 sorbent and compares the amounts of captured and released P within 20 capture-release cycles. All the three types of zeolite exhibit great recyclability. The drop of uptake capacity is only marginal in the first 10 cycles, although it becomes more substantial in subsequent cycles (FIG. 4a). For example, Cu-ZSM-5(3) has an uptake of 32.6 mg-P/$g_{zeolite}$ in the first cycle, and sustained ~95% and ~78% of this capacity by the 10th and 20th cycle, respectively. In comparison, Cu-ZSM-5(1) and Cu-ZSM-5(2) have initial uptake capacities of ~28 and ~30 mg-P/$g_{zeolite}$, with ~61% and ~64% retention of the initial capacity in the 20th cycle, respectively. The release of P is found to follow a similar trend as that for capture, with 13.1, 13.5 and 22.4 mg of P recovered from each gram of Cu-ZSM-5(1), Cu-ZSM-5(2) and Cu-ZSM-5(3) sorbent in the 20th cycle, respectively (FIG. 4b). These values correspond to ~53%, ~55% and ~31% retention of the amounts of P recovered in the first cycle.

The recyclability performances are further illustrated by the plots of release and recovery efficiencies over the course of the 20 capture-release cycles (FIG. 4c). Here, the efficiency of release represents the ratio between the released and captured amount of P in each cycle, whereas the recovery efficiency indicates the percentage of net recovered P compared to the initial amount of dissolved P in the starting solution (10 ml of $Na_2HPO_4$ solution at 1 g-P/L, using 300 mg of sorbent). For all the three types of zeolite, the release efficiency is consistently at 80-90% throughout the recyclability studies. In contrast, the efficiency of recovery drops from ~73% to ~39% for Cu-ZSM-5(1), from ~79% to ~41% for Cu-ZSM-5(2), and from ~88% to ~67% for Cu-ZSM-5(3) in 20 cycles. These observations suggest that the recyclability may not be limited by the desorption of phosphate, but rather by the capacity of capture. The latter can be correlated to the loss of Cu content throughout the capture-release cycles, as characterized by ICP-MS analysis for the cycled sorbents (FIG. 4d). The Cu site densities preserved after 20 cycles are found to be 524, 551 and 564 $\mu mol_{Cu}/g_{zeolite}$ for the three types of zeolites, with the order still being consistent with that for the recovery efficiency at the end of the recyclability studies, namely Cu-ZSM-5(3)>Cu-ZSM-5(2)>Cu-ZSM-5(1).

Figure 10:
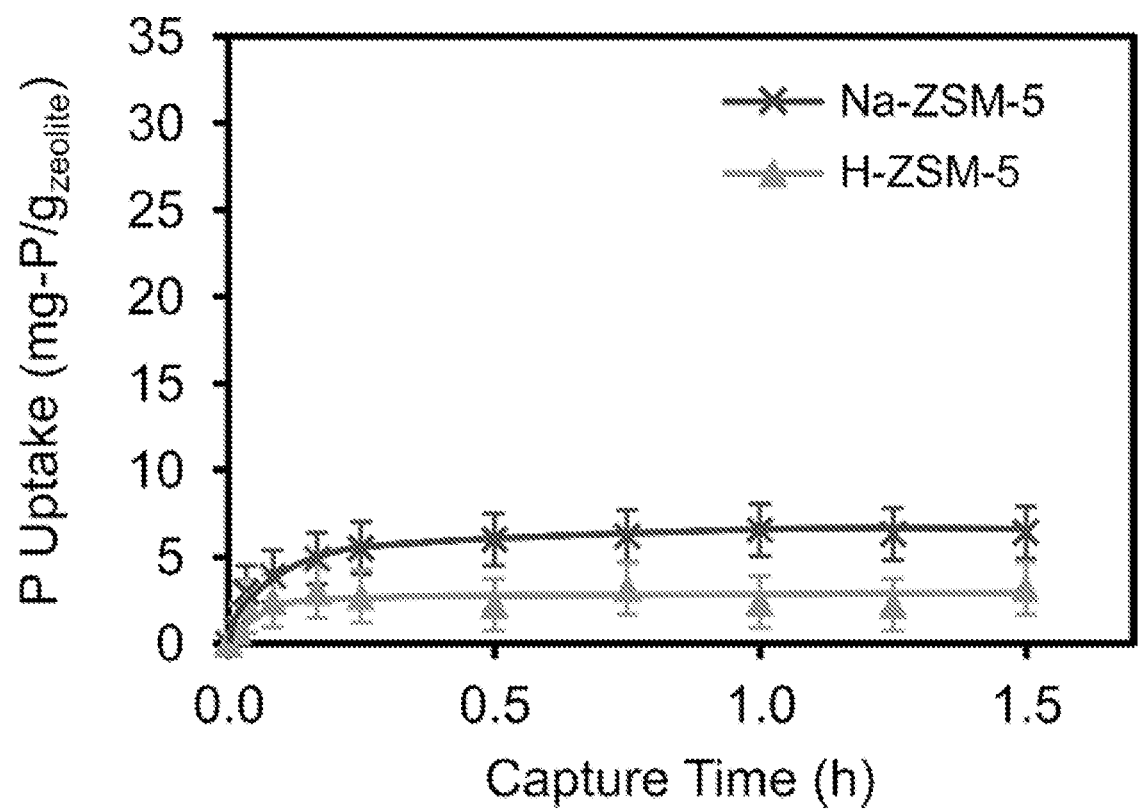
FIG. 10 shows P uptake over time for 300 mg of H-ZSM-5 and Na-ZSM-5.

Phosphate Adsorption. The above discussions have revealed a strong correlation of the capacity of P capture to the density of Cu sites for the Cu-ZSM-5 sorbents, suggesting that Cu functions as the active sites for phosphate adsorption. Although this may be explicit considering the atomic structures of Cu-ZSM-5, it is noted that pristine zeolites (without metal substitution) have also been reported to be capable of capturing P. Our control experiments on using H-ZSM-5 or Na-ZSM-5 show very limited capacity of P capture (<10%, FIG. 10), indicating that the monovalent cations ($H^+$ and $Na^+$) are not beneficial for anion adsorption and the small capacity may be ascribed to hydrogen bond interactions between the phosphate anions and the framework oxygen. In Cu-ZSM-5, the substituted Cu(II) is known to be chelated on the —O—Al—O— site in the 10-membered ring and create positive charge centers. It is possible that these positive charged sites accommodate anion adsorption and facilitate ion exchange. To validate this scheme, comparative studies are further performed on Cu-ZSM-5 subjected to different pretreatment conditions, as described below.

Figure 5:
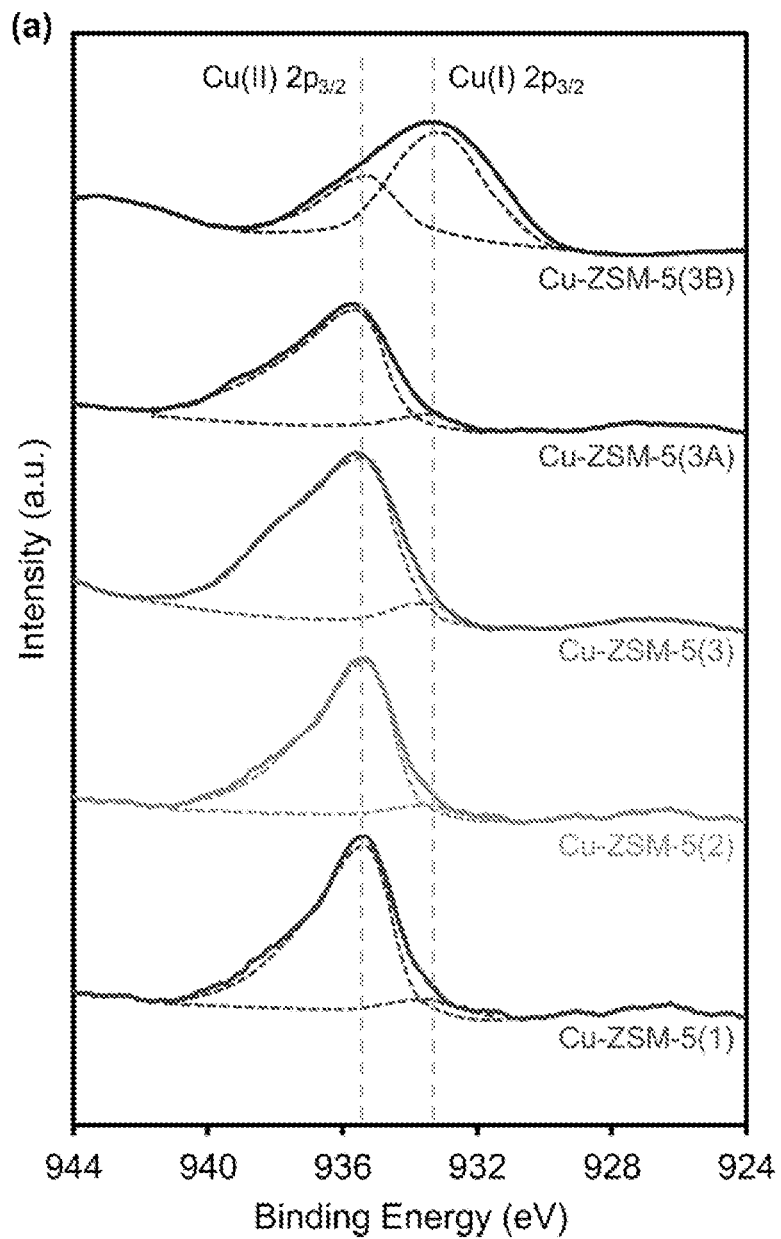
FIG. 5 shows (a) Cu $2p_{3/2}$ spectra for Cu-ZSM-5 sorbents. (b) P uptake over time for 300 mg of Cu-ZSM-5(3), Cu-ZSM-5(3A) and Cu-ZSM-5(3B). (c) P uptake compared to Cu(II) ratio for Cu-ZSM-5(3), Cu-ZSM-5(3A) and Cu-ZSM-5(3B).
Figure 5:
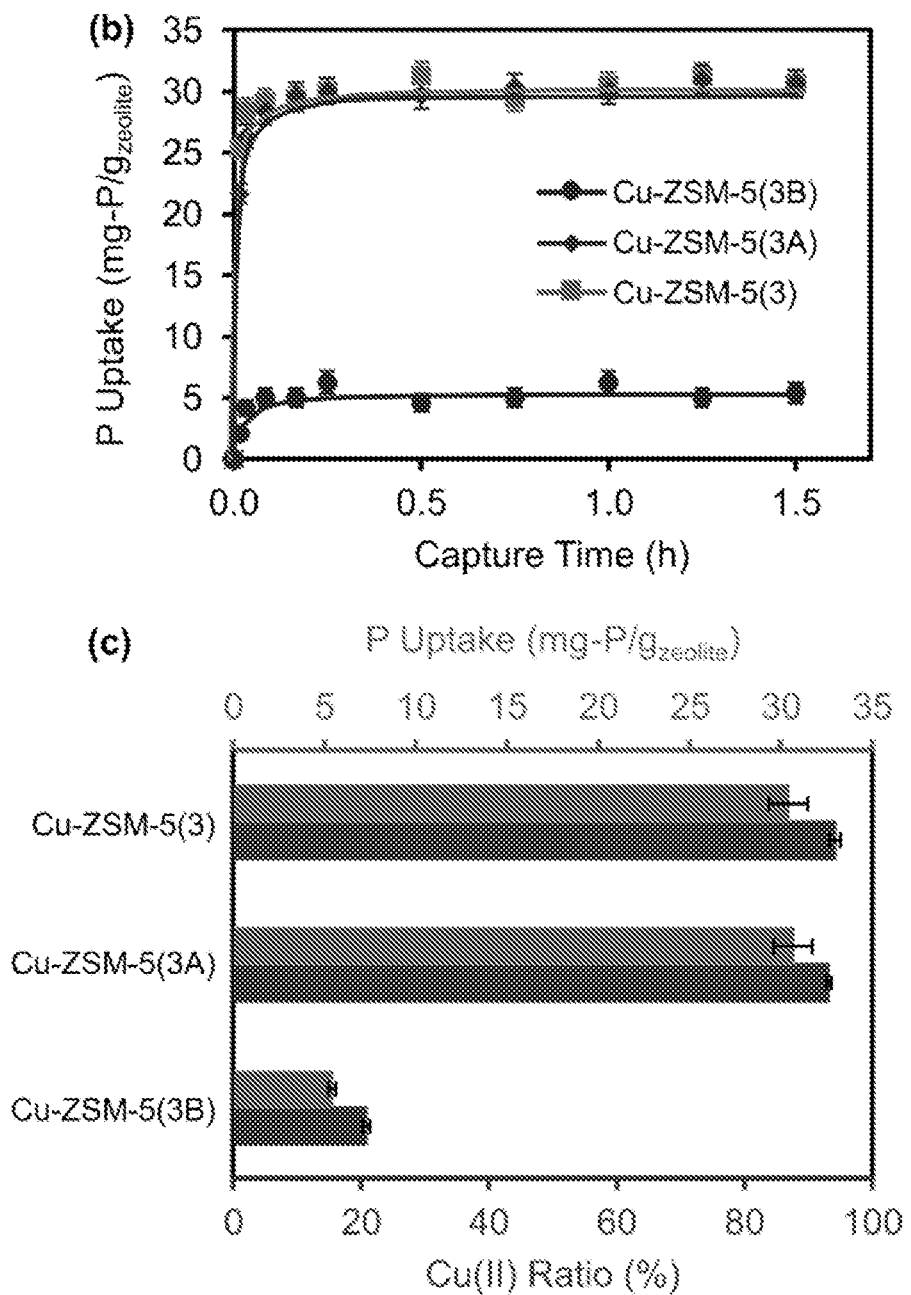
Figure 6:
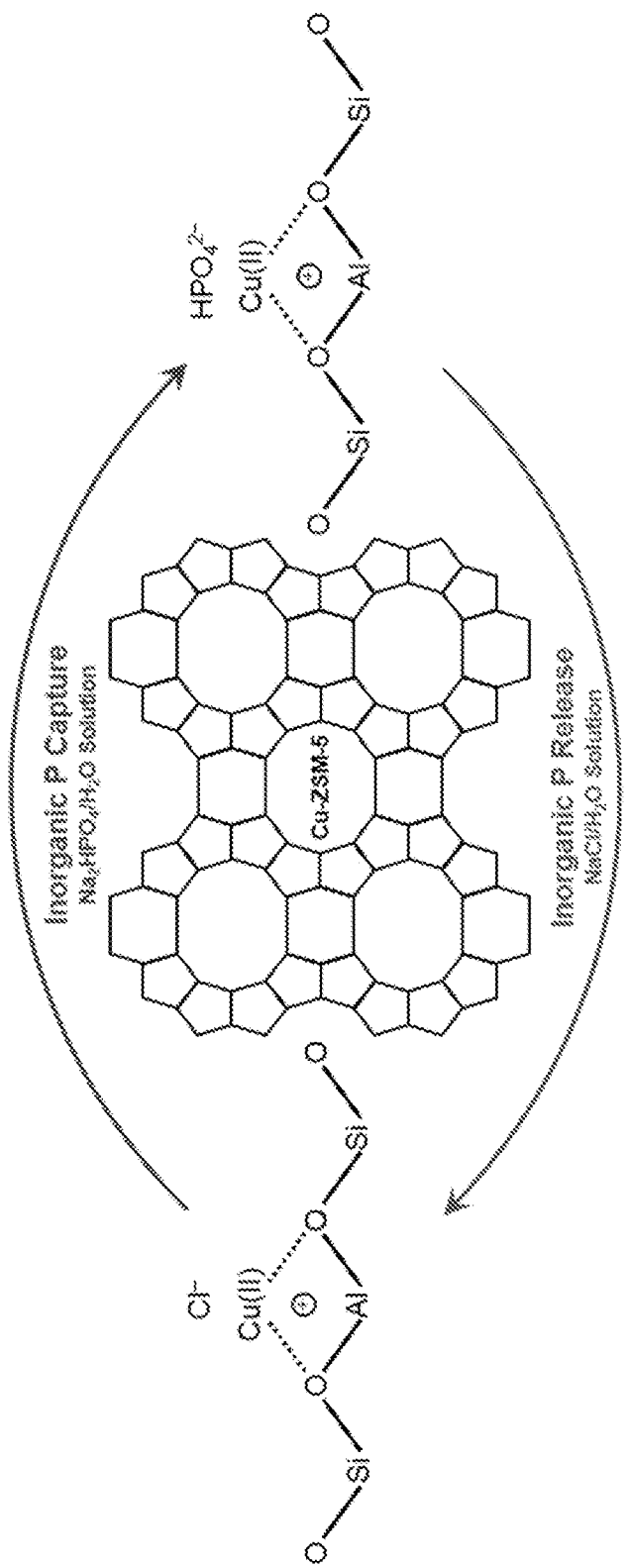
FIG. 6 shows a graphical representation of an example of a method of the present disclosure.

Cu-ZSM-5 with the Cu/Al ratio of 0.51 is used as the example here. The Cu-ZSM-5(3) sorbent mentioned in the above discussion was prepared by calcination at 100° C. in air for overnight. Pretreatment at 500° C. in static air or in He was also applied to the zeolite with the same Cu/Au ratio, with the obtained products denoted as Cu-ZSM-5(3A) or Cu-ZSM-5(3B), respectively (Table 2). The oxidation state of Cu in these zeolites was characterized by using XPS (FIG. 5a). The Cu $2p_{3/2}$ peak is deconvoluted on the basis of Cu(I) at the binding energy of 933.3 eV and Cu(II) at 935.4 eV, with the deconvoluted peak areas used to determine the molar fractions of Cu(I) and Cu(II) in the zeolites (Table 2). It is revealed that >90% of the Cu species in Cu-ZSM-5(3) and Cu-ZSM-5(3A) is in the +2 state, whereas a significant portion (~80%) of Cu is converted into +1 state in Cu-ZSM-5(3B).

TABLE 2

Preparation method, Cu site density, and ratios of Cu(I) and Cu(II) in Cu-ZSM-5(3), Cu-ZSM-5(3A) and Cu-ZSM-5(3B).

| Sample | Preparation After $Cu^{2+}$ Exchange | Cu Site Density ($\mu mol_{Cu}/g_{zeolite}$) | Cu(I) Ratio (%) | Cu(II) Ratio (%) |
|---|---|---|---|---|
| Cu-ZSM-5(3) | 100° C. Overnight, Static Air | 626 | 5.8 | 94.2 |
| Cu-ZSM-5(3A) | 500° C. 2 h, Static Air | 626 | 6.2 | 93.2 |
| Cu-ZSM-5(3B) | 500° C. 2 h, He | 626 | 79.2 | 20.8 |

FIG. 5b shows the comparison of P capture by using the three types of Cu-ZSM-5 with the same Cu/Al ratio (0.51). It is found that Cu-ZSM-5(3) and Cu-ZSM-S(3A) have similar kinetic behaviors and capacities for P capture, reaching an uptake of ~31 mg-P/$g_{zeolite}$, whereas Cu-ZSM-S(3B) has only a low uptake of ~5 mg-P/$g_{zeolite}$. By plotting the uptake of P and the ratio of Cu(II) (in the total amount of Cu species) together, a strong correlation is clearly seen between these two values (FIG. 5c). This finding, together with the observation that the Cu species is also predominantly Cu(II) in Cu-ZSM-S(1) and Cu-ZSM-5(2) (FIG. 5a), thus validates that the phosphate adsorption sites are associated with Cu(II) in the Cu-ZSM-5 sorbents.

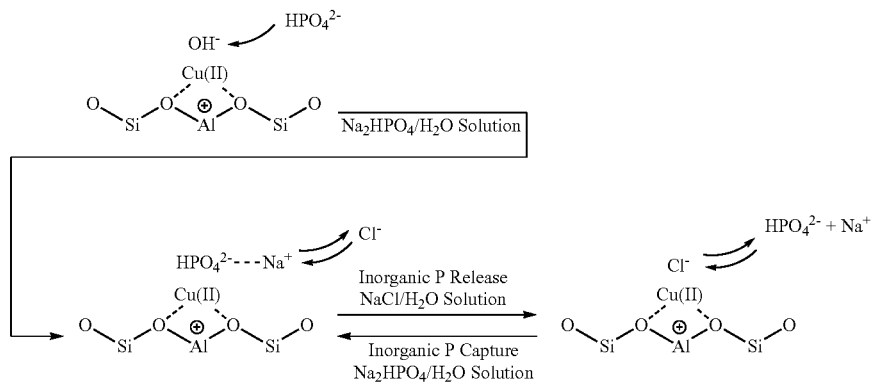

Scheme 2. Proposed mechanism of P capture and release using Cu-ZSM-5.

Mechanism for Ion Exchange. With Cu(II) determined to be the active site for phosphate adsorption, a ligand exchange mechanism is provided for anion exchange on Cu-ZSM-5. As shown in Scheme 2, the first step of P capture (at pH=8.6±0.1) is believed to involve the reaction

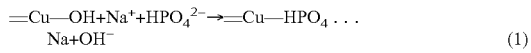
(1)

where ≡Cu represents the positively charged Cu(II) site on the ZSM-5 framework, with the hydroxyl group introduced for charge balance. This hydroxyl group could undergo ligand exchange with hydrogen phosphate ($HPO_4^{2-}$) anions in the solution phase, assisted by solvated $Na^+$ cations for charge balance. The release of $OH^-$ from this step is confirmed by the rise of pH to 9.5±0.1 after capture (Table 3). After the initial capture, the release of P in NaCl solution could be written as

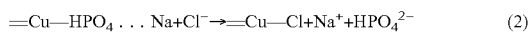
(2)

and the following P capture then takes place by the reversed process

(3)

where $Na^+$ is also introduced for charge balance. These ion exchange reactions are also confirmed by the changes of solution pH measured during the capture-release cycles. After release of the hydrogen phosphate, the pH of the brine solution is raised by about one unit, whereas the pH of the $Na_2HPO_4$ solution drops from ~8.6 to ~7.1 after the P capture. These pH changes are consistent with the expectations considering the alterations of phosphate concentrations in the cyclic process.

TABLE 3

Measured solution pH during initial and subsequent capture/release cycles.

| Cycle | Solution | Stage | pH |
|---|---|---|---|
| First Capture-Release Cycle | $Na_2HPO_4/H_2O$ | Before Capture | 8.6 ± 0.1 |
| | | After Capture | 9.5 ± 0.1 |
| | $NaCl/H_2O$ | Before Release | 6.9 ± 0.1 |
| | | After Release | 8.3 ± 0.1 |
| Subsequent Capture-Release Cycles | $Na_2HPO_4/H_2O$ | Before Capture | 8.6 ± 0.1 |
| | | After Capture | 7.1 ± 0.1 |
| | $NaCl/H_2O$ | Before Release | 6.9 ± 0.1 |
| | | After Release | 8.0 ± 0.1 |

It should be noted that the stoichiometries of these reactions may differ from eq. (1-3) and the number of phosphate (and chloride) anions adsorbed per Cu(II) site could be >1. For example, the molar ratio between P and Cu (P/Cu) calculated based on the measured uptake (FIG. 2a) is about ~1 at the mass loading of 100 mg for all the three types of zeolites, which suggests monolayer coverage being dominant in this situation. When the loading of sorbent is reduced, the P/Cu ratio becomes larger, reaching as high as ~2.5 for Cu-ZSM-5(1) at the loading of 10 mg. The adsorption of multiple phosphate anions on one Cu(II) site could be stabilized by the formation of hydrogen bonds between phosphates, as well as between phosphate and the framework, polymerization between phosphates, and/or involvement of multiple $Na^+$ cations in the inner sphere.

Systematic studies are reported on Cu-ZSM-5 as sorbents for phosphorus recovery. Fast capture and release of phosphate anions are demonstrated with >90% efficiency of recovery using synthetic solutions of $Na_2HPO_4$ and NaCl, respectively. The zeolite sorbents are also found to be recyclable and sustain desirable recovery efficiency after multiple capture-release cycles. Cu(II) species in the zeolites are identified to be the active sites for anion adsorption, upon which a ligand exchange mechanism is proposed for the capture and release of phosphorus. The present disclosure highlights the utility of metal substituted zeolites as sorbents for anion exchange and the recovery of nutrients from wastewater streams.

METHODS. Materials and Chemicals. The following materials were purchased and used as-received without further purification: L-ascorbic acid ($C_6H_8O_6$, reagent grade, Sigma), ammonium molybdate tetrahydrate (($NH_4$)$_6Mo_7O_{24}$·$4H_2O$, ACS reagent, 81.0-83.0% $MoO_3$ basis, Sigma-Aldrich), copper(II) acetate monohydrate (Cu($CO_2CH_3$)$_2$—$H_2O$, ≥99.0%, Sigma-Aldrich), nitric acid ($HNO_3$, ACS grade, Fisher), sodium chloride (NaCl, ≥99.0%, Fisher), sodium nitrate ($NaNO_3$, ≥99.0%, Sigma-Aldrich), sodium phosphate dibasic ($Na_2HPO_4$, ≥98.5%, Sigma), sodium sulfate ($Na_2SO_4$, anhydrous, ACS grade, VWR) sulfuric acid ($H_2SO_4$, ACS grade, BDH), Zeolite Socony Mobil-5 (ZSM-5, ammonium, Si/Al=11.5, Alfa Aesar), and anhydrous ethanol ($C_2H_5OH$, 200 proof, ACS/USP grade, Pharmco-Aaper). Deionized water was collected from an ELGA PURELAB flex apparatus.

Synthesis of Cu-ZSM-5. Commercial $NH_4$-ZSM-5 (Alfa Aesar, Si/Al=11.5) was calcined at 450° C. for 4 h in static air, which is converted into H-ZSM-5. Na-ZSM-5 was prepared by dispersing H-ZSM-5 in 1 M $NaNO_3$ solution (about 10 ml solution was used per gram of zeolite), which was held at 80° C. under stirring for 4 h. The Na-ZSM-5 was further exchanged with $Cu^{2+}$ cations by using three different protocols. Cu-ZSM-5(1) and Cu-ZSM-5(2) were prepared by exchanging two or three times, respectively, in a 0.01 mol/L copper(II) acetate solution at 25° C. for 24 h. Cu-ZSM-5(3) was prepared by exchanging three times in a 0.1 M copper(II) acetate solution at 25° C. for 24 h. After each step of exchange, the sorbents were rinsed with deionized water three times. The obtained Cu-ZSM-5 sorbents were dried at 100° C. overnight in static air.

Characterization. Scanning electron microscopy (SEM) images were taken on a JEOL 6700F field emission electron scanning microscope (SEM) operating at 10.0 kV. Transmission electron microscopy (TEM) images were taken on an FEI Tecnai 12 operating at 100 kV. X-ray diffraction (XRD) patterns were obtained from a PANalytical X'Pert X-ray diffractometer equipped with a Cu Kα radiation source (λ=1.5406 Å). Nitrogen adsorption measurements were measured on a Micromeritics ASAP 2010 instrument with the samples degassed under vacuum at 300° C. for 4 h. Specific surface area (SSA) was calculated using the Brunauer-Emmett-Teller (BET) theory. The Cu and Al contents were determined by inductively coupled plasma mass spectrometry (ICP-MS) using a PerkinElmer Elan DRC II Quadrupole ICP-MS after dissolution of the zeolites in HF. X-ray photoelectron spectroscopy (XPS) spectra were collected on a PHI 5400 X-ray photoelectron spectrometer equipped with an Al Kα X-ray source.

Inorganic P Capture and Release. Synthetic solutions of 1000 mg-P/L (calculated on the basis of elemental P) were prepared by dissolving $Na_2HPO_4$ in deionized water. In a typical capture process, iv300 mg of Cu-ZSM-5 sorbent was added to 10 mL of the $Na_2HPO_4$ solution. The formed mixture was stirred (700 rpm) at room temperature for up to 1.5 h for P capture. After separation of the sorbent by centrifugation, P release was performed by mixing the sorbent with 10 mL of NaCl solution (10 g/L). At designated time intervals during the capture and release, aliquots of the solutions were extracted from the mixture and centrifuged to remove the sorbent. The obtained supernatants were treated with a molybdenum blue assay, and ultraviolet-visible (UV-Vis) absorption spectra were collected on these treated supernatants using a Promega GloMax Multi Detection System to determine the concentration of inorganic P.

Molybdenum Blue Assay Preparation Method and Ultraviolet-Visible Spectroscopy (UV-Vis) Standard Curve To prepare the molybdenum blue assay for detecting inorganic P, 1 mL of sulfuric acid ($H_2SO_4$) was diluted to a total volume of 11 mL with deionized water. 80 mg of ammonium molybdate tetrahydrate (($NH_4$)$_6$$Mo_7$$O_{24}$-$4H_2O$) was dissolved in the acid solution. 35 mg of L-ascorbic acid ($C_6H_8O_6$) was added. The solution was thoroughly mixed and turned yellow as the reagents were fully dissolved.

The resulting assay was used immediately after preparation. The assay lost its efficacy when left overnight. 16 μL of the assay was added to 200 mL of a target sample or inorganic P standard. The sample of interest immediately began turning blue and was analyzed at 890 nm via UV-Vis spectroscopy within 10 min of treatment.

Stock phosphate solutions were prepared by dissolving precisely measured quantities of sodium phosphate dibasic ($Na_2HPO_4$) in deionized water and were used to construct a standard curve.

Although the present disclosure has been described with respect to one or more particular embodiments and/or examples, it will be understood that other embodiments and/or examples of the present disclosure may be made without departing from the scope of the present disclosure.

The invention claimed is:

1. A method for removing inorganic phosphorus from a sample comprising:
   a) providing one or more aluminosilicate material comprising a plurality of copper species;
   b) contacting the aluminosilicate material with the sample comprising inorganic phosphorus, wherein at least a portion of the inorganic phosphorus in the sample is associated with the aluminosilicate material; and
   c) removing the aluminosilicate material from b) from the sample,
wherein at least a portion of the inorganic phosphorus is removed from the sample.

2. The method of claim 1, further comprising:
   d) contacting the aluminosilicate material from c) with an aqueous medium comprising a chloride salt,
wherein at least a portion of the inorganic phosphorus associated with the aluminosilicate material disassociates from the aluminosilicate material and is in the aqueous medium, and
   e) optionally, removing the aluminosilicate material from the aqueous medium from d).

3. The method of claim 2, further comprising isolating at least a portion of the inorganic phosphorus from the aqueous medium after any d) or e).

4. The method of claim 3, wherein the isolating for any individual isolating step is carried out by precipitation.

5. The method of claim 1, further comprising repeating a) c), optionally, d), and optionally e) with the aluminosilicate material from c) and/or the aluminosilicate material from e) a desired number of times.

6. The method of claim 1, wherein the sample is wastewater, runoff, or water.

7. The method of claim 1, wherein the sample is an aqueous sample.

8. The method of claim 7, wherein the sample has a pH of 8 to 9.

9. The method of claim 1, wherein the inorganic phosphorus is present in the sample at 0.0001 to 0.01 weight % based on the total weight of the sample.

10. The method of claim 1, wherein the contacting for any one b) and/or e) is carried out for 0.1 to 1.5 hours.

11. The method of claim 1, wherein the contacting for any one contacting step is carried out at room temperature or without any heating and, optionally, with mixing.

12. The method of claim 1, wherein the removing for any one removing step is carried out by filtration or centrifugation.

13. The method of claim 1, wherein the amount of aluminosilicate material provides a sample having 0.0001 to 10 weight % aluminosilicate material based on the total weight of sample and aluminosilicate material.

14. The method of claim 1, wherein the aluminosilicate material is pretreated prior to contact with the sample.

15. The method of claim 1, wherein the copper species are present at 0.001 to 10 weight % based on the total weight of the aluminosilicate material.

16. The method of claim 1, wherein a molar ratio of aluminum to copper species is 0.4 to 5.5.

17. The method of claim 1, wherein the aluminosilicate materials have a surface area of 350-400 $m^2/g$.

18. The method of claim 1, wherein the aluminosilicate materials are particulate materials having an average size of about 1 micron.

19. The method of claim 1, wherein the aluminosilicate material is a zeolite.

20. The method of claim 19, wherein the zeolite is $Na_nAl_nSi_{96-n}O_{192} \cdot 16H_2O$, wherein n is 7-8.

* * * * *